US011044897B2

(12) United States Patent
Breunig et al.

(10) Patent No.: US 11,044,897 B2
(45) Date of Patent: Jun. 29, 2021

(54) FISHING LURE TROLLING SPREADER BAR

(71) Applicant: Sterling Tackle, South Marmora, NJ (US)

(72) Inventors: Steven Edward Breunig, Marmora, NJ (US); Elliot Breunig, Marmora, NJ (US)

(73) Assignee: Sterling Tackle, South Marmora, NJ (US)

( * ) Notice: Subject to any disclaimer, the term of this patent is extended or adjusted under 35 U.S.C. 154(b) by 0 days.

(21) Appl. No.: 15/929,793

(22) Filed: May 21, 2020

(65) Prior Publication Data
US 2020/0281178 A1 Sep. 10, 2020

Related U.S. Application Data

(63) Continuation-in-part of application No. 15/969,448, filed on May 2, 2018, now abandoned.

(60) Provisional application No. 62/522,182, filed on Jun. 20, 2017.

(51) Int. Cl.
*A01K 91/053* (2006.01)
*A01K 91/08* (2006.01)
*A01K 73/04* (2006.01)
*A01K 83/00* (2006.01)
*A01K 95/00* (2006.01)

(52) U.S. Cl.
CPC ............... *A01K 73/04* (2013.01); *A01K 83/00* (2013.01); *A01K 91/053* (2013.01); *A01K 91/08* (2013.01); *A01K 95/00* (2013.01)

(58) Field of Classification Search
CPC ....... A01K 91/08; A01K 91/053; A01K 91/14

USPC .......... 43/42.74, 43.13, 42.22, 43.12, 42.15, 43/44.9, 44.91, 43.15, 27.4, 43.1; D22/126–133; 114/39.15, 127, 128, 132, 114/138, 140, 149, 162; 441/79
See application file for complete search history.

(56) References Cited

U.S. PATENT DOCUMENTS

| | | | | |
|---|---|---|---|---|
| 14,587 A * | 4/1856 | Smith | ................... | A01K 91/053 43/42.74 |
| 1,352,979 A * | 9/1920 | Lawrence | ............ | A01K 91/053 43/42.74 |
| 2,449,692 A * | 9/1948 | Eichendorff | ......... | A01K 91/053 43/42.52 |
| 2,462,290 A * | 2/1949 | Sauvey | ................ | A01K 91/053 43/42.74 |
| 2,883,785 A * | 4/1959 | Croft | ...................... | A01K 85/16 43/42.09 |
| 2,883,787 A * | 4/1959 | Dahl | ...................... | A01K 85/16 43/43.13 |
| 2,923,085 A * | 2/1960 | Dahl | ...................... | A01K 91/08 43/43.13 |

(Continued)

*Primary Examiner* — Darren W Ark
*Assistant Examiner* — Katelyn T Truong
(74) *Attorney, Agent, or Firm* — Buchanan Ingersoll & Rooney PC

(57) ABSTRACT

A keel attached to a central body of trolling spreader bar is configurable with a plurality of fishing lures as an assembly to mimic a small school of fish. The keel is angled to urge the lure assembly continually to one side or the other from what would be the normal straight line of travel of a trolling vessel. By attaching an angled keel directly to the lure/spreader bar one is able to easily set lines behind the vessel at varying angles and distances which greatly increase the width of the full trolling lure spread.

13 Claims, 20 Drawing Sheets

(56) References Cited

U.S. PATENT DOCUMENTS

| | | | | |
|---|---|---|---|---|
| 2,924,907 A * | 2/1960 | Hamilton | A01K 91/08 | 43/43.13 |
| 3,626,628 A * | 12/1971 | Weimer | A01K 85/16 | 43/42.03 |
| 3,858,344 A * | 1/1975 | Watts | A01K 85/12 | 43/42.05 |
| 3,878,636 A * | 4/1975 | George | A01K 93/00 | 43/42.74 |
| 3,916,556 A * | 11/1975 | Armanno | A01K 85/16 | 43/42.06 |
| 4,254,573 A * | 3/1981 | Mastropaolo | A01K 91/08 | 43/43.13 |
| 4,794,721 A * | 1/1989 | Rowe, Jr. | A01K 85/00 | 43/42.13 |
| 4,893,432 A * | 1/1990 | Rosengrant | A01K 91/053 | 43/42.74 |
| 4,998,374 A * | 3/1991 | Barnett | A01K 91/08 | 43/42.74 |
| 5,094,026 A * | 3/1992 | Correll | A01K 85/00 | 43/42.11 |
| 5,189,827 A * | 3/1993 | Mrozek | A01K 91/053 | 24/129 R |
| 6,000,166 A * | 12/1999 | Kirkpatrick | A01K 91/06 | 43/42.74 |
| 6,185,857 B1 * | 2/2001 | Hnizdor | A01K 85/00 | 43/42.11 |
| 6,439,940 B1 * | 8/2002 | Pouchkarev | B63B 32/64 | 441/79 |
| 6,658,784 B1 * | 12/2003 | Mastropaolo | A01K 91/08 | 43/42.22 |
| 8,978,289 B2 * | 3/2015 | Willis | A01K 85/00 | 43/42.13 |
| 9,003,690 B1 * | 4/2015 | Rye | A01K 85/10 | 43/42.74 |
| 9,896,168 B1 * | 2/2018 | Lindbergh | B63B 32/60 | |
| D834,680 S * | 11/2018 | McDonnell, Jr. | D22/133 | |
| 2003/0056424 A1 * | 3/2003 | Mueller | A01K 91/02 | 43/43.13 |
| 2004/0242093 A1 * | 12/2004 | Geraghty | B63B 32/66 | 441/79 |
| 2007/0220798 A1 * | 9/2007 | Davidson | A01K 85/00 | 43/4 |
| 2008/0083153 A1 * | 4/2008 | Ford | A01K 91/08 | 43/43.13 |
| 2016/0165868 A1 * | 6/2016 | LeHew | A01K 91/053 | 43/42.32 |
| 2019/0281802 A1 * | 9/2019 | Cherry | A01K 91/047 | |

* cited by examiner

FISHING LURE TROLLING SPREADER BAR

CROSS-REFERENCE TO RELATED APPLICATION

This application is a continuation-in-part of U.S. non-provisional application Ser. No. 15/969,448 filed May 2, 2018, which claims the benefit of priority of U.S. provisional application No. 62/522,182 filed Jun. 20, 2017, the contents of which are herein incorporated by reference.

BACKGROUND

Field of the Invention

The present invention relates to fishing lures, and more particularly to spreader bars used to separate a plurality of fishing lures while trolling.

Certain embodiments disclosed herein relate to a fishing lure having an elongated central body having at least one adjustable keel, wherein the elongated central body is connected or otherwise attached to at least one spreader bar which in turn is connected or otherwise attached to a plurality of bait lures which trail behind the elongated central body in the water behind a fishing vessel.

Other embodiments disclosed herein relate to a fishing lure having an elongated central body having at least one adjustable keel and a rotatable base plate, wherein the elongated central body is connected or otherwise attached to at least one spreader bar which in turn is connected or otherwise attached to a plurality of bait lures which trail behind the elongated central body in the water behind a fishing vessel.

Other embodiments disclosed herein relate to a fishing lure having an elongated central body having at least one adjustable keel which is adjustable to one of a plurality of defined positions, wherein the elongated central body is connected or otherwise attached to at least one spreader bar which in turn is connected or otherwise attached to a plurality of bait lures which trail behind the elongated central body in the water behind a fishing vessel.

Other embodiments disclosed herein relate to a fishing lure having an elongated central body having at least one adjustable keel and a rotatable base plate which is adjustable to one of a plurality of defined positions, wherein the elongated central body is connected or otherwise attached to at least one spreader bar which in turn is connected or otherwise attached to a plurality of bait lures which trail behind the elongated central body in the water behind a fishing vessel.

Other embodiments disclosed herein relate to a fishing lure having an elongated central body having at least one adjustable keel which is adjustable along a substantially continuous groove, wherein the elongated central body is connected or otherwise attached to at least one spreader bar which in turn is connected or otherwise attached to a plurality of bait lures which trail behind the elongated central body in the water behind a fishing vessel.

Other embodiments disclosed herein relate to a fishing lure having an elongated central body having at least one adjustable keel and a rotatable base plate which is adjustable along a substantially continuous groove, wherein the elongated central body is connected or otherwise attached to at least one spreader bar which in turn is connected or otherwise attached to a plurality of bait lures which trail behind the elongated central body in the water behind a fishing vessel.

When trolling, a plurality of lures may be extended behind the trolling vessel. Lures being trolled behind a boat track an essentially straight path behind the point from which they are pulled (e.g., a rod tip or outrigger release). This limits the total width of water that may be covered by the fisherman's lures, which in turn limits the number of fish that see and therefore may strike the lures. Lures that run very wide from the boat run in so-called "clean water", which is water that is essentially undisturbed by the boat's engine turbulence/bubble trail and wake. Clean water provides better visibility of the lures as well as a more natural setting to the predator fish who do most their feeding in natural clean water.

Previously, the only means available to widen the path of trolled spreader bar lures were outriggers attached to the boat, planer boards and out-rovers.

Outriggers are costly and are limited in their extension length from the sides of the trolling vessel. Similarly, planer boards have been utilized.

Planer boards are not attached directly to the lure for ease of use. Instead the fishing line is attached to the planer board by a release clip and then to a lure tracking well behind the planar board. Planer boards are also limited as they are typically used in calm bay-like conditions and do not function well in rough ocean-like conditions.

Out-rover devices use a combination of a keel and a rudder which causes them to be large and bulky, which inhibits them from imitating natural bait (e.g., fish and/or squid) well, which in turn limits their effectiveness in catching fish.

Thus, there is a need for improved systems and methods for trolling that increase the spread width, and thereby the number of lures that may be pulled behind a trolling vessel while fishing. By increasing the spread width of the lures a vessel will expose the lures to a greater number of fish and therefore more opportunities for fish to see and strike the lures.

SUMMARY

Described herein are various, non-limiting embodiments of a fishing lure comprising an elongated central body having at least one adjustable keel, at least one spreader bar, and a plurality of bait lures.

In one aspect of embodiments described herein, a trolling spreader bar includes an elongated central body, a spreader bar that extends laterally outwardly from the central body, and a keel that extends from a ventral surface of the elongated central body at an angle relative to a longitudinal axis of the central body. The trolling spreader is configured such that the central body is guided laterally outwardly from the direction of travel of the trolling spreader bar while trolling.

In a preferred embodiment, the keel angle is adjustable relative to the longitudinal axis of the central body. The central body may also include a second keel extending from a dorsal surface of the central body.

A lateral fin may also be provided to extend outwardly from the central body. The lateral fin may be adjustable about a lateral axis of the central body to control a depth at which the trolling spreader bar may travel when trolling.

In certain embodiments, a lateral fin described herein provides a planing lift to prevent a lure from diving beneath the water (i.e., subsurface) and remaining there for a duration of time without resurfacing.

In other embodiments, a lateral fin described herein may cause a lure to dive subsurface.

In yet other embodiments, a lateral fin described herein may be adjustable to permit a user to set the angle of the lateral fin such that it will prevent subsurface diving or that it will facilitate or cause subsurface diving, as desired by the user based on water conditions and target species.

In some embodiments, the spreader bar also includes a first rod and a second rod that extend laterally from the central body. A first bait lure may be attached to an end of the first rod and the second rod. The first rod and the second rod may be configured to have an aft sweep.

In other preferred embodiments, a plurality of bait lures are interconnected to the first bait lure by a line extending between an aft end of a preceding bait lure and a front end of a succeeding bait lure. At least an outboard one of the first bait lure further comprises a counterweight. The counterweight may be carried within a body of the first bait lure. The plurality of bait lures may also include a plurality of hooks adapted to receive a live bait.

In other aspects of embodiments described herein, a trolling spreader bar is provided with an elongated central body, and a keel attached to a ventral surface of the elongated central body. A spreader bar extends laterally outward from a left side and a right side of the central body. A first bait lure is attached to a first end and a second end of the spreader bar.

In some embodiments, a counterweight is attached to at least an outboard end of the spreader bar, relative to a direction of travel of the spreader bar in a body of water. The counterweight may be the first bait lure. The counterweight may also be carried within a body of the first bait lure.

In preferred embodiments, the keel angle is adjustably attached relative to the longitudinal axis of the body. A second keel may also extend from a dorsal surface of the central body. In other embodiments, a lateral fin extends outwardly from the central body. The lateral fin is preferably adjustable about a lateral axis of the central body to control a depth at which the trolling spreader bar may travel when trolling in the body of water.

In yet other aspects of embodiments described herein, the plurality of bait lures interconnected to the first bait lure by a line extending between an aft end of a preceding bait lure and a front end of a succeeding bait lure.

These and other features, aspects and advantages of embodiments described herein will become better understood with reference to the following drawings, description, examples and claims.

DETAILED DESCRIPTION OF THE INVENTION

The following detailed description is of the best currently contemplated modes of carrying out exemplary embodiments described herein. The description is not to be taken in a limiting sense, but is made merely for the purpose of illustrating the general principles of embodiments described herein, the scope of which should be understood with reference to the claims.

Broadly, embodiments described herein provide a system, method and apparatus for trolling that improves the spread, and thereby the number of lures that may be pulled behind a trolling vessel while fishing. By attaching an angled keel 14 or rudder directly to a lure/spreader bar, one is able to easily set lines behind the boat at varying angles and distances which greatly increase the width of a full trolling lure spread.

Figure 1:
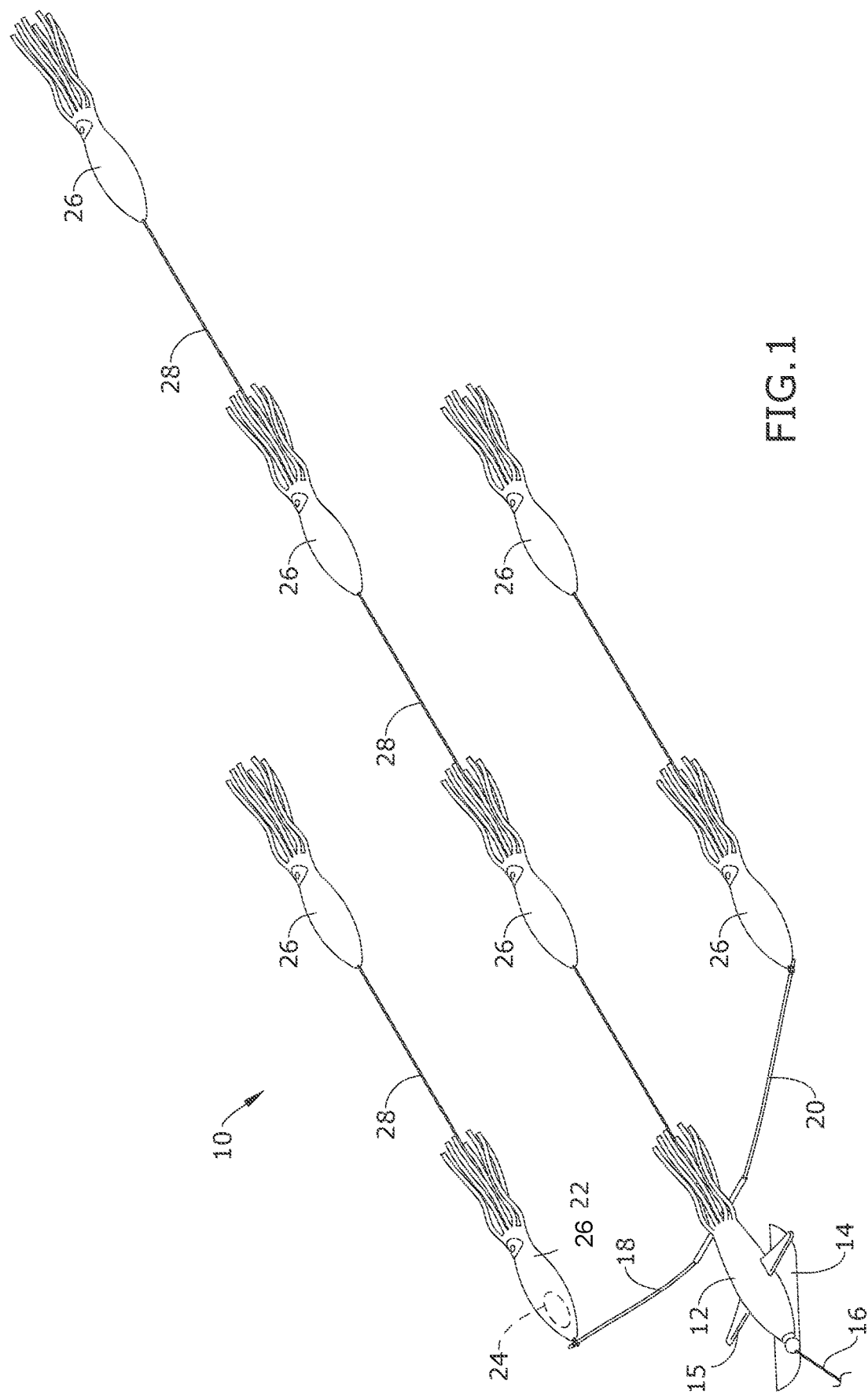
FIG. 1 is a perspective view of a wide tracker fishing lure spreader bar.

As seen in reference to FIG. 1, a spreader bar 10 according to aspects of an exemplary embodiment is shown. The spreader bar 10 includes an elongated central body 12, or hub and a spreader bar 10 or rod 18, 20 that extends laterally from the central body 12, or hub. The central body 12 may be in the form of a fish bait. The central body 12 has a keel 14 that extends from the central body 12 at an angle relative to a longitudinal axis of the central body 12.

The keel 14 is angled such that the central body 12 is guided laterally outwardly from the direction of travel of the fishing vessel 32 while trolling. The keel 14 angle may be adjustable relative to the body. The keel 14 may extend from a dorsal or ventral surface of the central body 12 or through the body. The central body 12 may also be configured with a lateral fin 15 to improve longitudinal stability and provide planing lift. Additionally, the lateral fin 15 may be adjustable to control the depth at which the lure assembly may travel when trolling.

Figure 2:
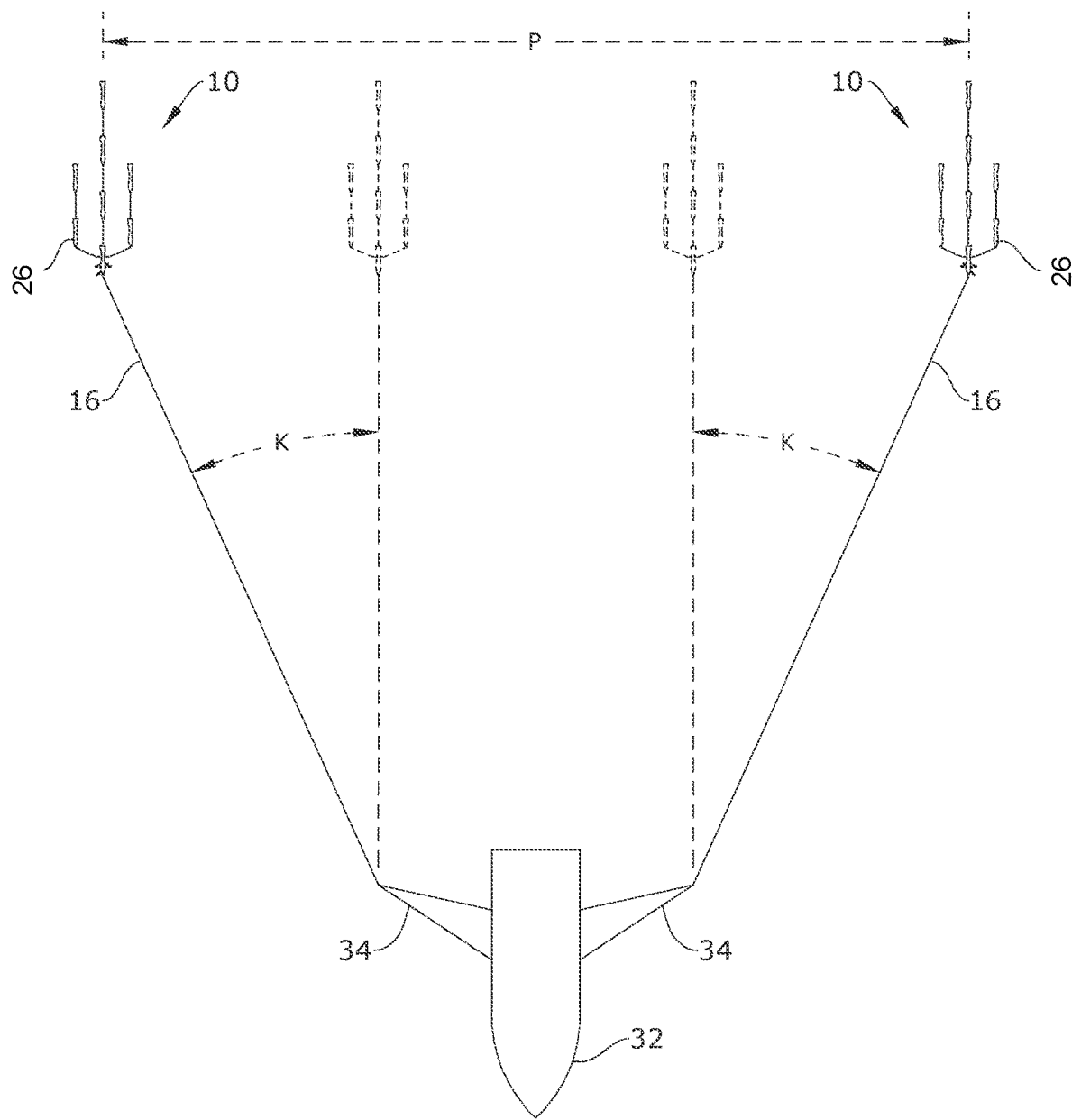
FIG. 2 is a schematic view of a plurality of the wide tracker fishing lure spreader bar shown in use in a trolling array.

As seen in reference to FIG. 2, a trolling configuration for a fishing vessel 32 according to aspects of an exemplary embodiment is illustrated. The trolling vessel 32 may be configured with a plurality of outriggers 34 extending laterally from the starboard and port sides of the vessel 32. With an exemplary spreader bar 10, the fishing lines 16 extend in a straight path from the stern of the vessel 32 and its direction of travel. The spreader bar 10 is configured with a plurality of lures 26 disposed in a spaced apart relation to replicate the schooling habits of a bait fish. The lures 26 are configured with one or more hooks so as to catch a game fish that may strike the lure 26. The lures 26 may also include a hooked natural bait, such as a squid, a crustacean, a baitfish, and the like.

In certain embodiments, a plurality of fishing lines 16 each carrying the aforementioned spreader bar 10 and lures 26 may be extended from the stern of the vessel 32. This enhances the ability of the trolling vessel 32 to replicate a large school of bait fish and thereby provide better opportunities to attract and catch a game fish. When employing a spreader bar 10 lure assembly, the lures 26 carried by the spreader bar 10 are urged outwardly by the keel 14 as the trolling vessel 32 pulls the spreader bar 10 through the water.

The spreader bar 10 has a first rod 18 and a second rod 20 that extend laterally from the central body 12 and may have a rearward sweep. A bait lure 26 may be operatively attached to ends of the first rod 18 and second rod 20. In addition, a plurality of bait lures 26 may be interconnected by a line 28 extending between an aft end of a preceding bait lure 26 and a front end of a succeeding or following bait lure 26 so as to replicate a school of fish bait, such as bait fish, mollusks, worms, squid, crustaceans, and the like.

In operation the angle keel 14 directs the lure/spreader bar 10 to one side or the other of the trolling vessel. Depending on the trolling velocity and weight of the spreader bar 10 and associated lures, the water pressure exerted on the angled keel 14 may cause the lure to become un-level and unstable as it is drawn through the water. Accordingly, a counterweight 24 may be provided to act against this pressure and keeps the lure level while tracking through or across the top of the water. The counterweight 24 may be operatively coupled to the first end or the second end of the spreader bar 10. Preferably the counterweight 24 is carried within the body of a bait lure 26 attached to the first and second ends of the spreader bar 10. In a preferred embodiment, the counterweight 24 is carried on the outward end of the arm 18, 20 relative to the lure assembly's 10 direction of travel so as to counteract the pressure applied to the angled keel 14. The body of the lead inboard lure 26 facilitates leveling as it planes on the water surface. The trailing lure bodies 26 serve to drag the rig and prevent "walking" or flipping of the rig in the water.

In use, a fisherman would attach an angled keel 14 lure/spreader bar 10 to his fishing line 16. The fisherman may then, while the vessel 32 is moving forward, let the lure assembly 10 out behind the vessel 32. When tension is applied to the fishing line 16 the angled keel 14 would direct the lure assembly off of its normally straight path to a new position laterally to the side of the vessel's 32 path of travel, thereby solving the problem of only having lures 26 dragging directly behind the pulling point on the vessel 32. He would instead have lures 26 tracking well out to each side of the vessel 32 running in clean water giving him a wider spread of fish bait for more game fish to see and strike.

In certain embodiments, the angled keel 14, stabilizing counter weight and corresponding lifting bait can be applied to surface trolling lures 26 such as spreader bars. By attaching an angled keel 14 directly to the lure/spreader bar 10 one is able to easily set lines behind the vessel at varying angles K and lateral separation P, which greatly increase the width of the full trolling lure spread.

Rotatable Base Plate

In an aspect, a rotatable base plate described herein is circular or essentially circular to permit rotation about a central axis.

In another aspect, the elongated central body comprises two threaded holes to accommodate screws for securing the rotatable base plate to the elongated central body in an essentially locked position or state for setting the adjustable keel at a desired angle.

In certain embodiments, a rotatable base plate described herein comprises a plurality of pairs of grooves or notches.

In an aspect, embodiments described herein do not comprise a screw or screws at a central point of the rotatable base plate. In another aspect, embodiments of rotatable base plates described herein do not rotate about a screw centrally located relative to the body of the rotatable base plate. In preferred embodiments, the screws securing the rotatable base plate to the elongated body are located near or toward the outer edge or perimeter or circumference of the rotatable base plate.

In an aspect, embodiments described herein do not comprise intersecting grooves on the rotatable base plate or elsewhere for purposes of adjusting the keel. Embodiments described herein do not comprise an "X" shaped groove or channel.

In a further aspect, embodiments described herein do not comprise any grooves or channels which intersect with, or are overlaid on, the center of the rotatable base plate.

Figure 5A:
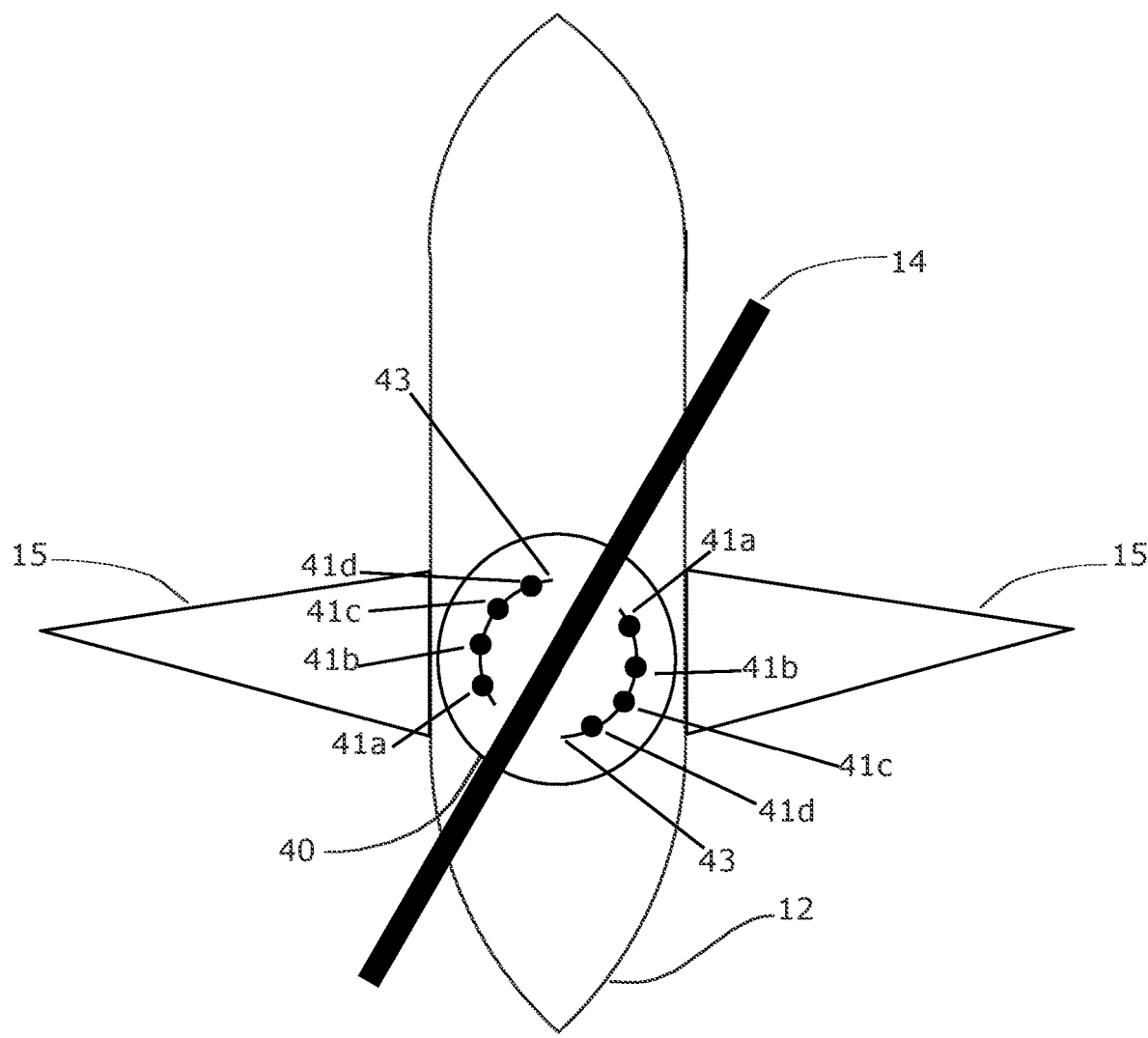
FIG. 5A is a bottom view of a rotatable base having a plurality of grooves or notches, the rotatable base being provided on an elongated body.
Figure 5B:
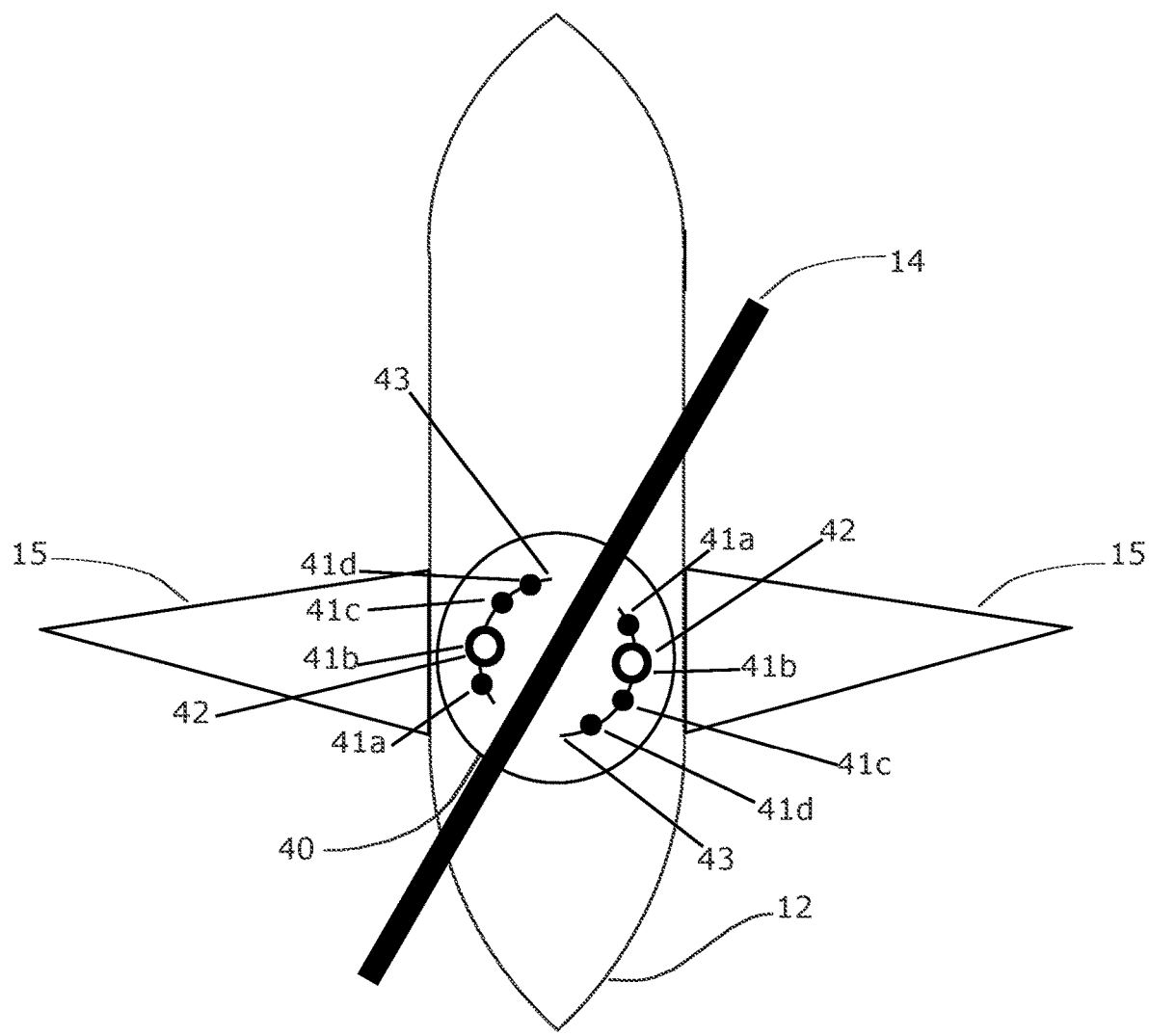
FIG. 5B is a bottom view of a rotatable base plate having a plurality of grooves or notches, the rotatable base plate being secured to the elongated body wherein screws are inserted for securing said rotatable base plate to an elongated central body with screws.

In reference to FIGS. 5A and 5B, an exemplary rotatable base plate 40 comprises a plurality of pairs of grooves or notches 41 through which screws 42 extend into the elongated central body to secure the rotatable base plate to the elongated central body 12. In an aspect, when the screws are loosened, the rotatable base plate may be freely rotated about a central axis such that the screws 42 may be tightened for setting the adjustable keel 14 at a desired position or angle.

By way of illustration, pairs of corresponding grooves or notches are depicted as 41a, 41b, 41c and 41d. By further way of illustration, a configuration is depicted wherein the keel 14 is positioned by securing the rotatable base plate 40 with screws 42 in a pair of grooves or notches 41b.

Thus, as the rotatable base plate 40 is rotated and secured into different positions, e.g. 41a, 41b, etc., the keel 14 is adjusted to a new position/angle.

In an aspect, the grooves or notches 41 of the rotatable base plate 40 are not threaded. In another aspect, consecutive grooves or notches 41 of the rotatable base plate are connected by a sliding groove (or sliding notch) 43 through which a loosened screw 42 may travel between consecutive grooves or notches 41. In an aspect, the sliding grooves/notches 43 are not threaded. In yet a further aspect, the grooves or notches 41 are essentially the same size as the major diameter of the screws 42 inserted therein or of the shanks of the screws 42 inserted therein.

In certain embodiments, the grooves or notches 41 are, at the outer surface of the rotatable base plate 40, tapered or otherwise beveled to accommodate the heads of the screws 42 inserted therein, i.e. such that the screws 42 are countersunk or essentially countersunk into the rotatable base plate 40 when tightened, the outer surface of the rotatable base plate 40 being the surface having the keel 14 affixed thereto.

Figure 5C:
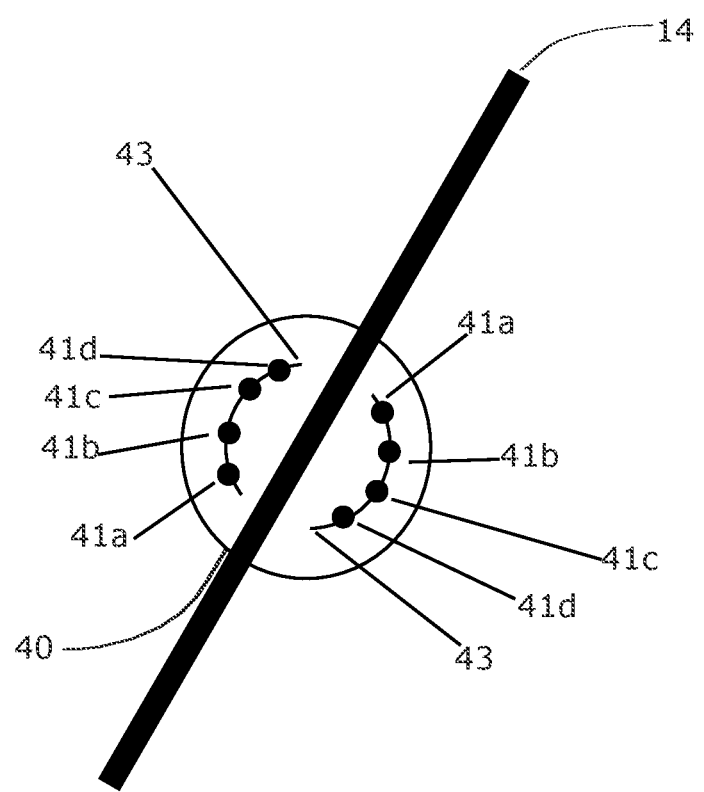
FIG. 5C is a view of a rotatable base plate having a plurality of grooves or notches.

FIG. 5C depicts an embodiment of the rotatable base plate 40 which is not secured to the elongated body 12.

Figure 5D:
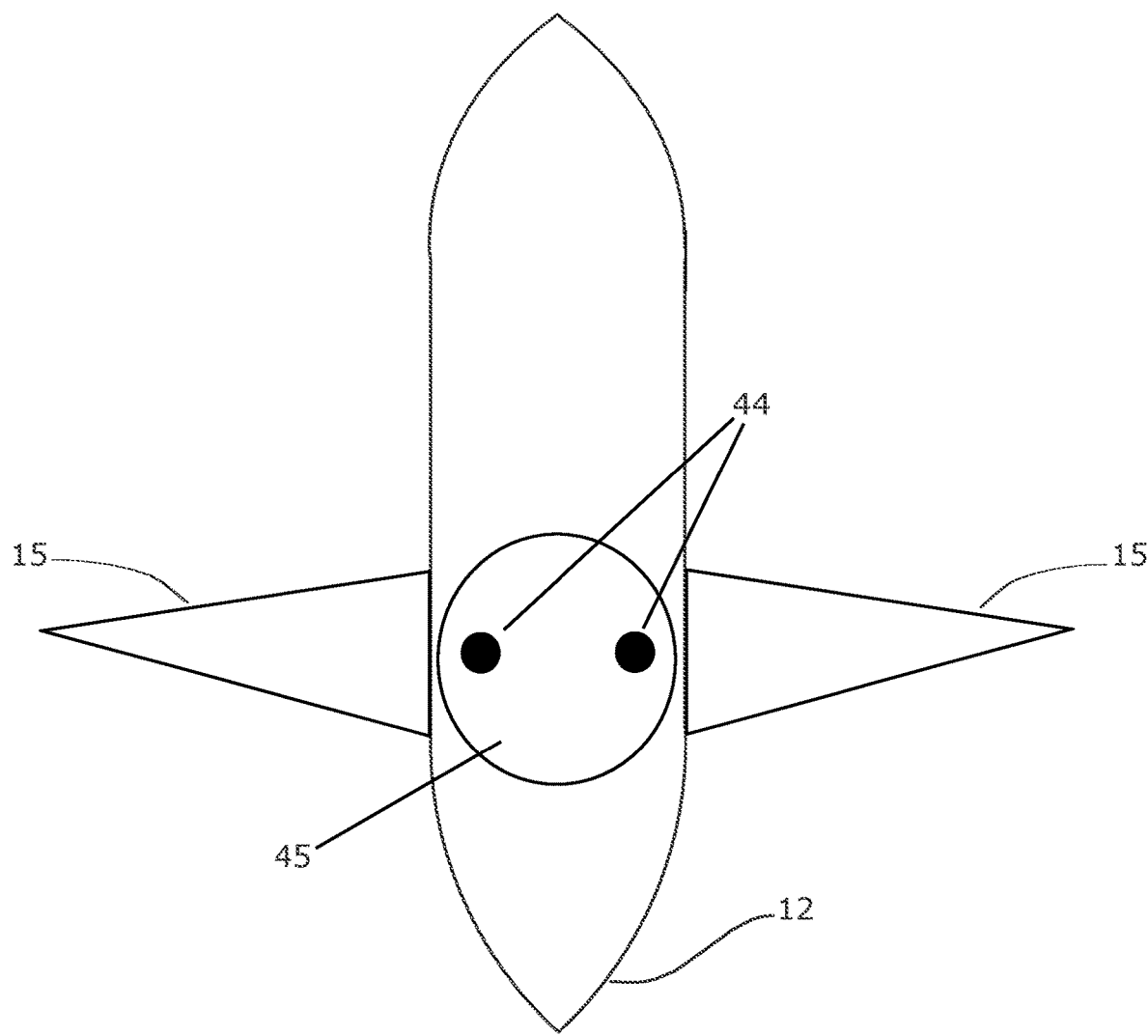
FIG. 5D is a bottom view of an elongate body comprising a pair of threaded holes and configured to receive a rotatable base plate.

FIG. 5D depicts the elongated body 12 when the rotatable base plate 40 is not secured thereto. The elongated body 12 has an area 45 in which the rotatable base plate is positioned or otherwise placed. The elongated body 12 comprises threaded holes 44 in such area in which the screws 42 may be tightened to secure the rotatable base plate 40 thereto.

Figure 6A:
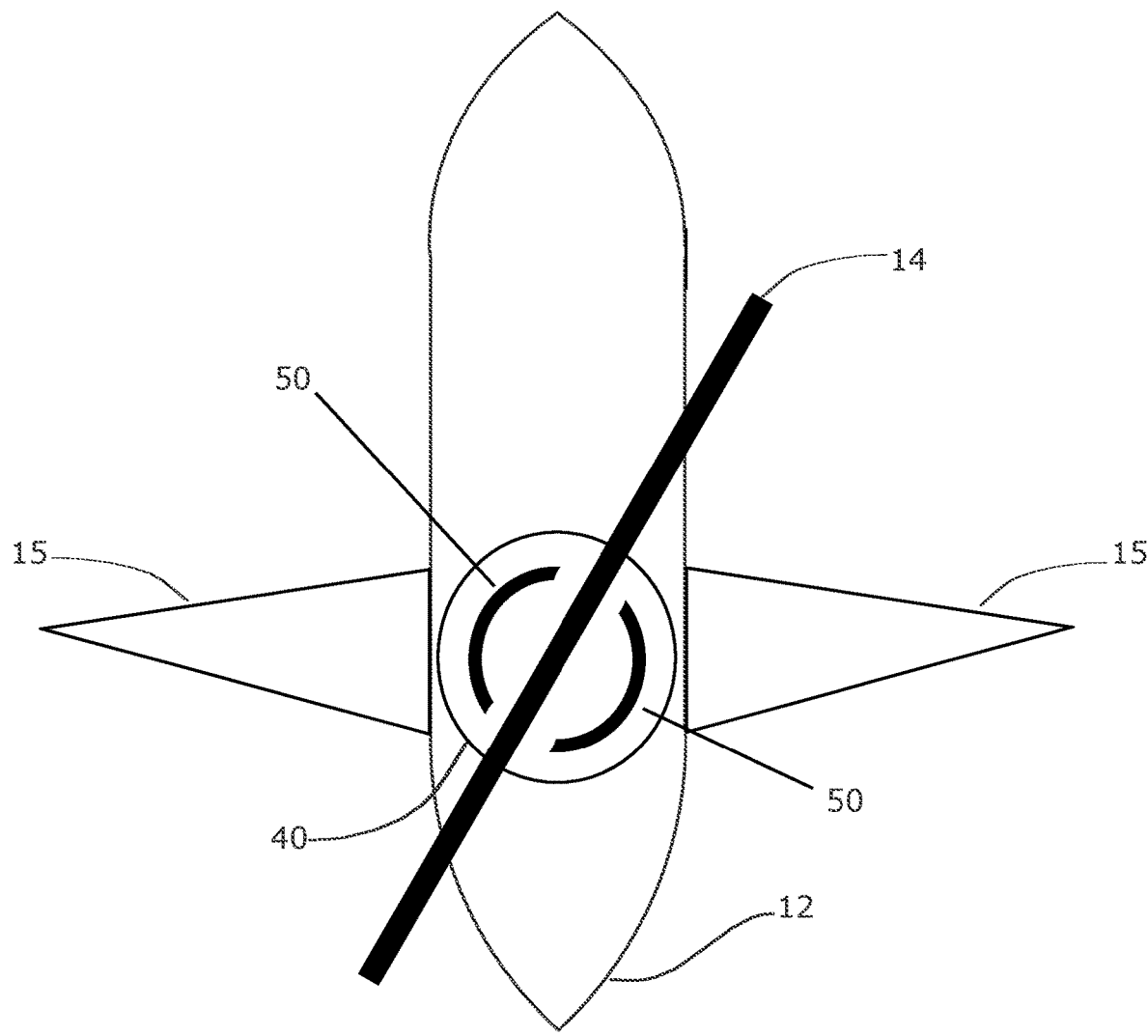
FIG. 6A is a bottom view of a rotatable base having a pair of substantially continuous grooves or notches, the rotatable base being provided on an elongated body.
Figure 6B:
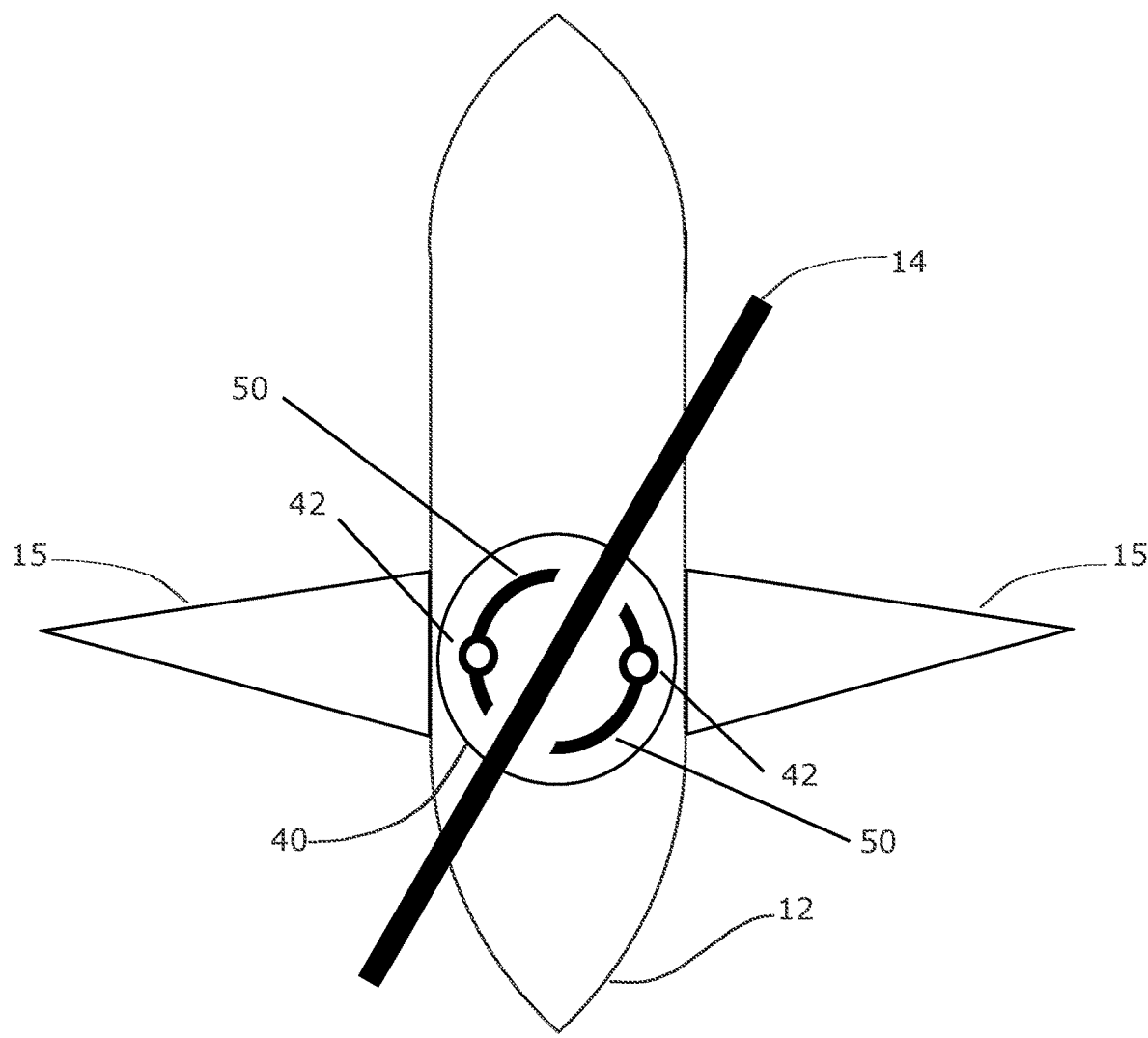
FIG. 6B is a bottom view of a rotatable base having a pair of substantially continuous grooves or notches wherein screws are inserted for securing said rotatable base plate to an elongated central body, the rotatable base plate being secured to the elongated body with screws.
Figure 6C:
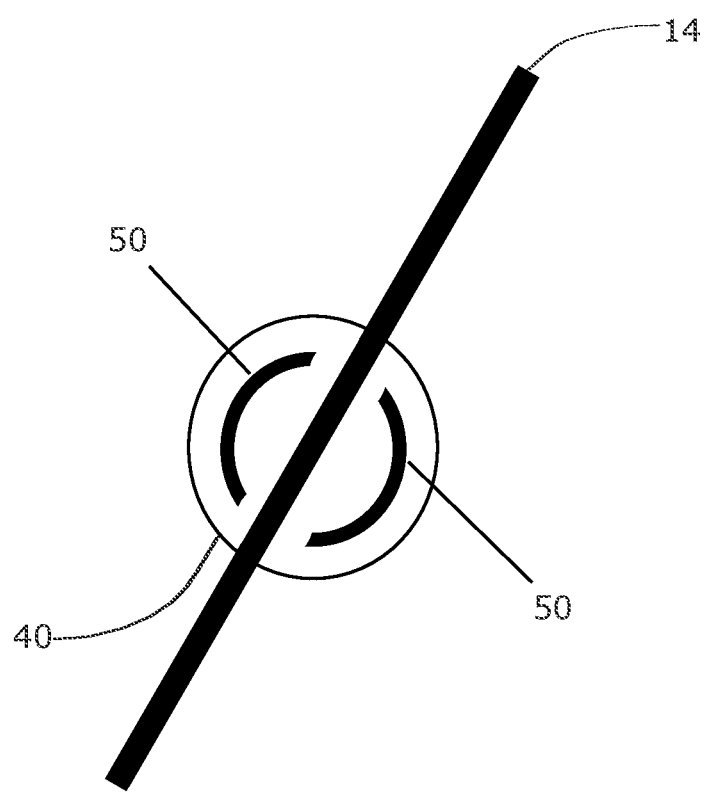
FIG. 6C is a view of a rotatable base having a pair of substantially continuous grooves or notches.

In reference to FIGS. 6A-6C, certain embodiments of a rotatable base plate 40 described herein comprise a pair of trench-like grooves 50. In an aspect, when the screws 42 are loosened and the rotatable base plate 40 is rotated, the screws 42 travel through the trench-like grooves 50 to adjust the keel 14 to a desired angle at which point the screws 42 may be tightened to set the desired keel angle.

In certain embodiments, the trench-like grooves 50 are of a thickness equal to or essentially equal to the major diameter of a screw 42 to be inserted therein, or equal to or essentially equal to the diameter of the shank of a screw 42 to be inserted therein.

In certain embodiments, the trench-like grooves 50 are, at the outer surface of the rotatable base plate 40, tapered or otherwise beveled to accommodate the heads of the screws 42 inserted therein, i.e. such that the screws 42 are countersunk or essentially countersunk into the rotatable base plate 40 when tightened.

In embodiments comprising trench-like grooves 50 instead of discrete grooves or notches 41, the screws 42 may be secured at any position along the trench-like grooves 50, permitting many more angles/positions for the keel 14 to be adjusted to.

Figure 7A:
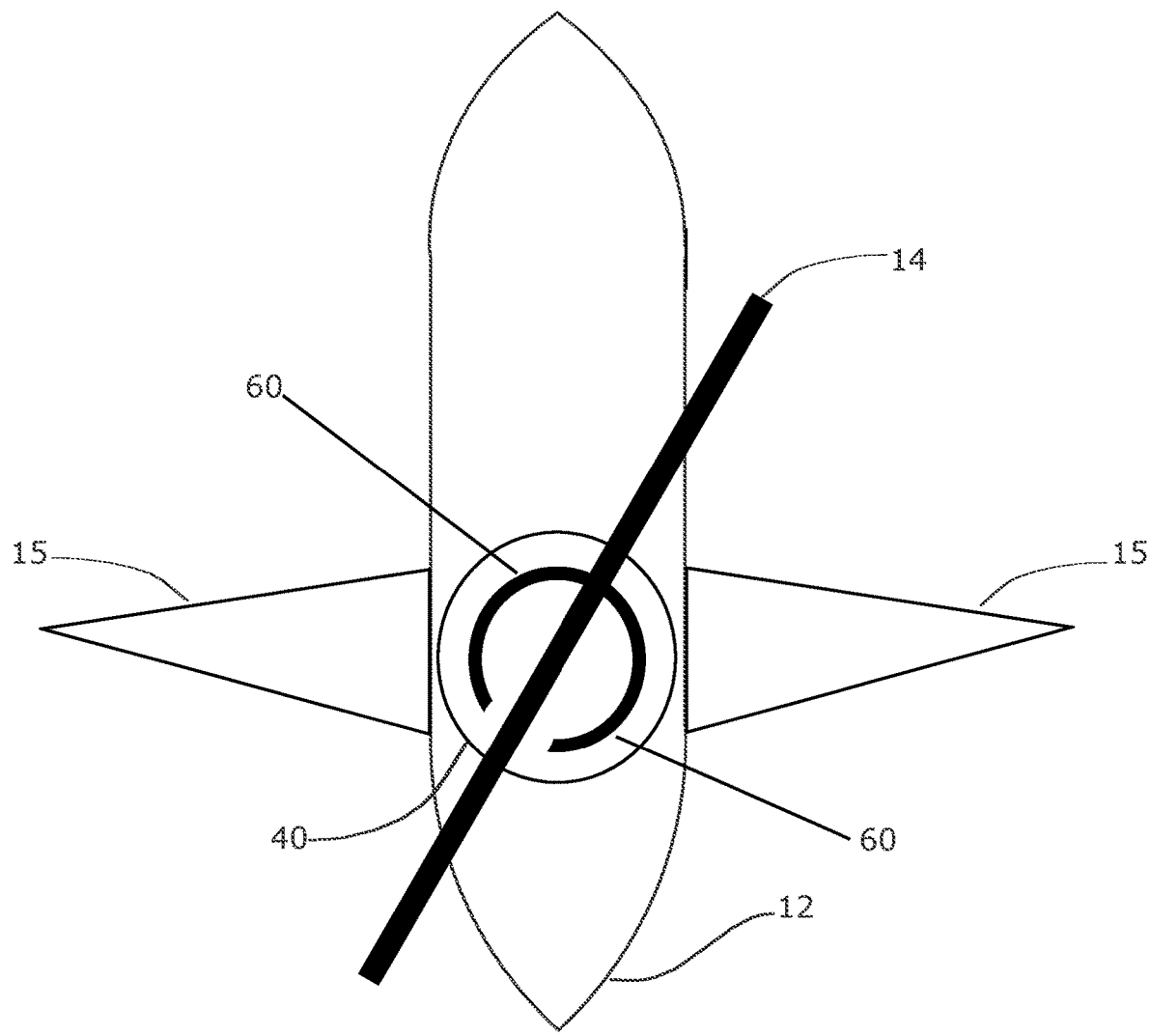
FIG. 7A is a bottom view of a rotatable base having a substantially continuous groove or notch, the rotatable base being provided on an elongated body.
Figure 7B:
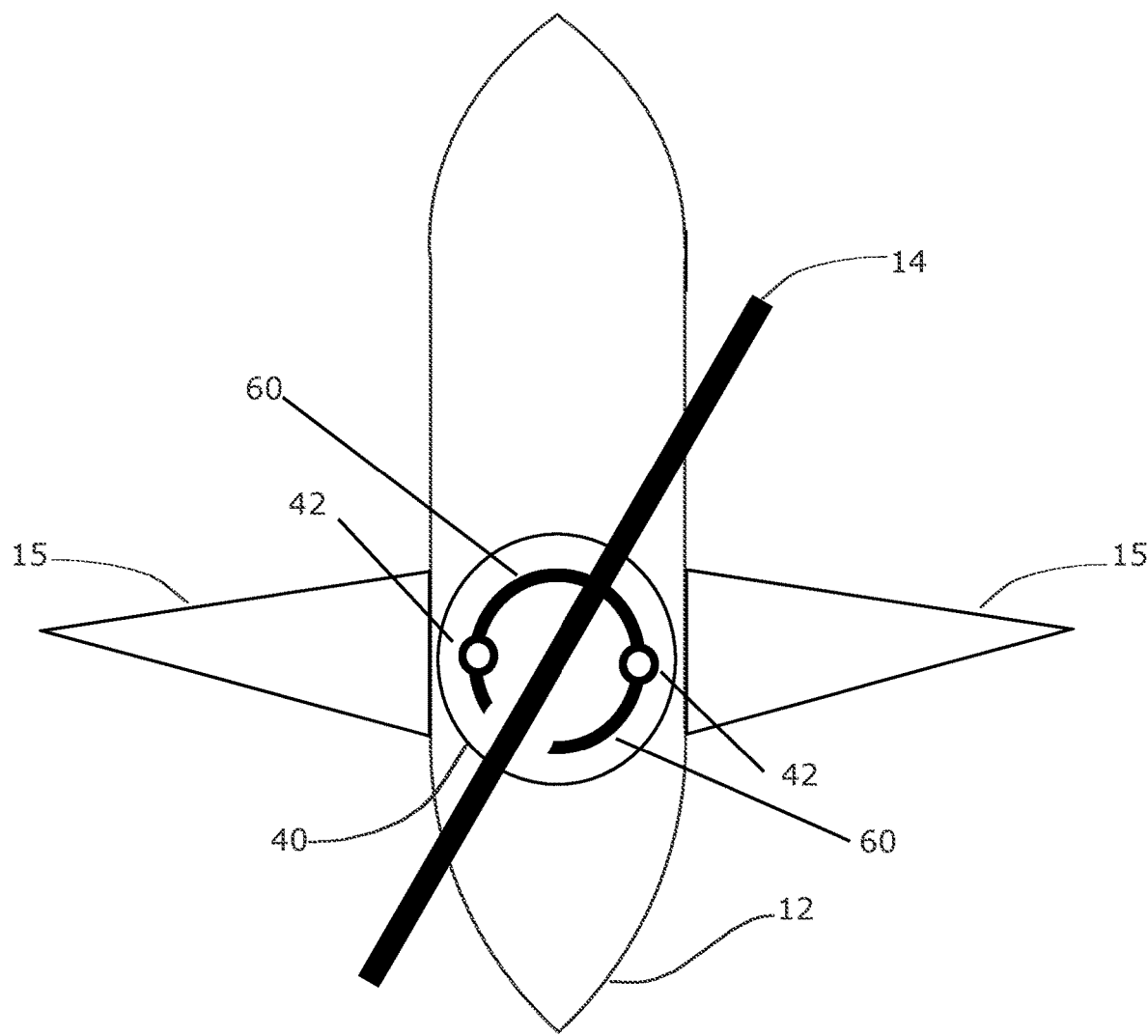
FIG. 7B is a bottom view of a rotatable base having a substantially continuous groove or notch wherein screws are inserted for securing said rotatable base plate to an elongated central body, the rotatable base plate being secured to the elongated body with screws.
Figure 7C:
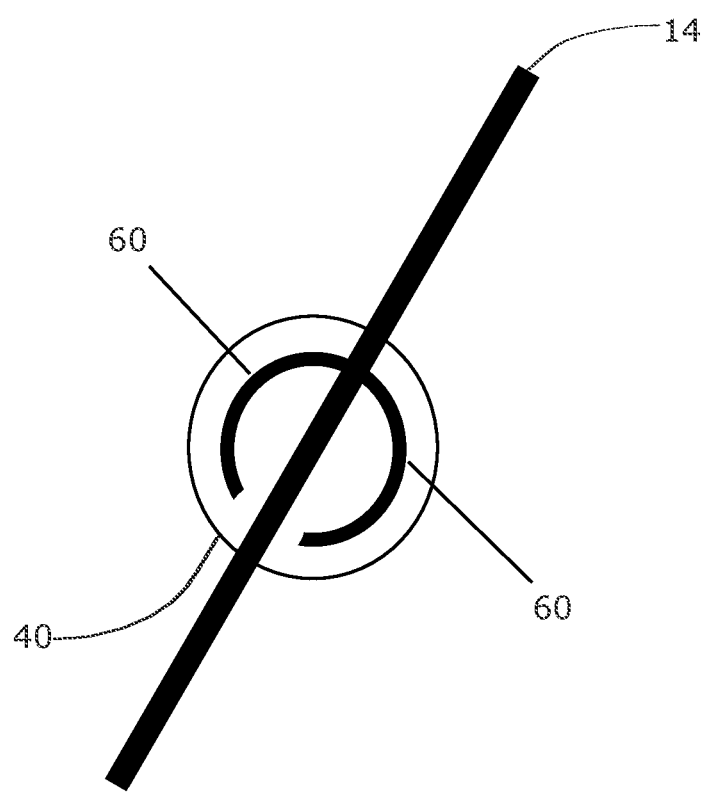
FIG. 7C is a view of a rotatable base having a substantially continuous groove or notch.
Figure 8:
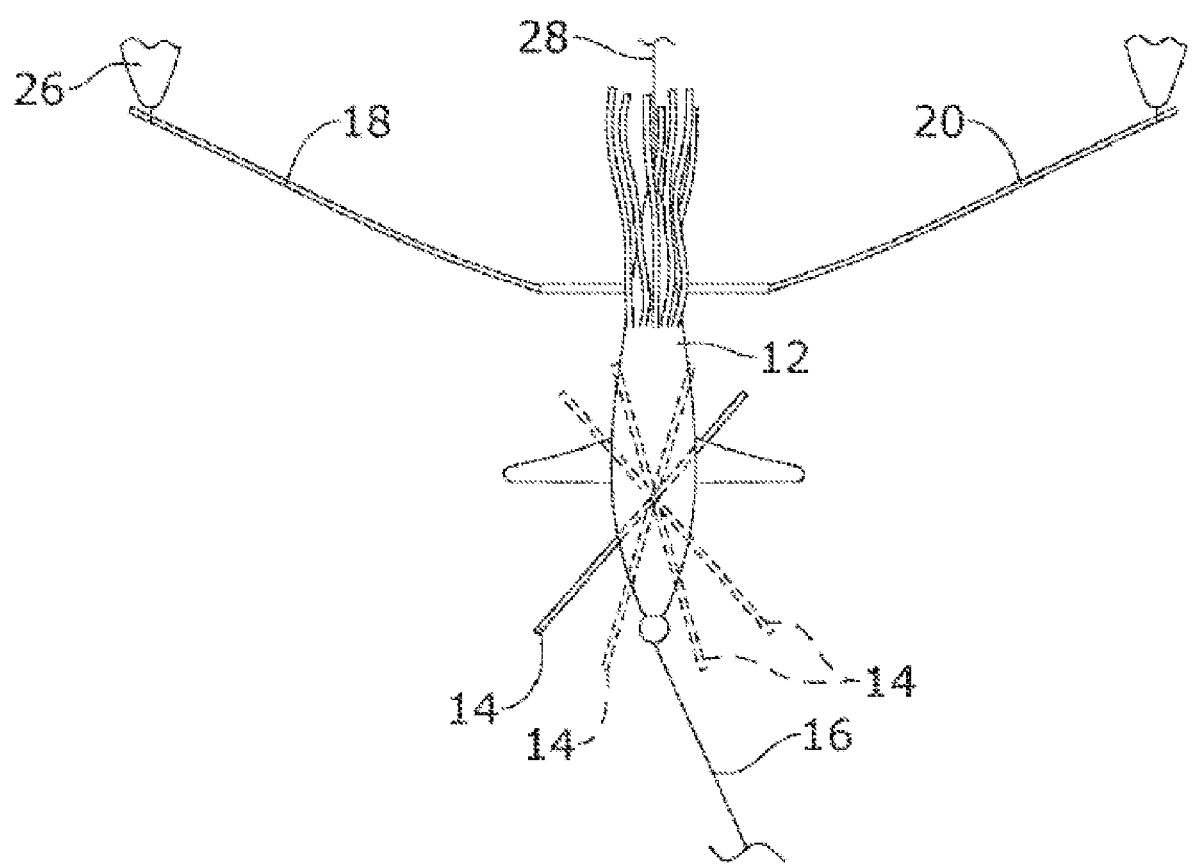
FIG. 8 is a bottom plan view of a fishing lure illustrating an adjustable keel.

In reference to FIGS. 7A-7C, certain embodiments of a rotatable base plate described herein comprise a single trench-like groove 60. In an aspect, when the screws 42 are loosened and the rotatable base plate 40 is rotated, the screws 42 travel through the trench-like groove 60 to adjust the keel 14 to a desired angle at which point the screws 42 may be tightened to set the desired keel angle.

In certain embodiments, the trench-like groove 60 is of a thickness equal to or essentially equal to the major diameter of a screw 42 to be inserted therein, or equal to or essentially equal to the diameter of the shank of a screw 42 to be inserted therein.

In certain embodiments, the trench-like groove 60 is, at the outer surface of the rotatable base plate 40, tapered or otherwise beveled to accommodate the heads of the screws 42 inserted therein, i.e. such that the screws 42 are countersunk or essentially countersunk into the rotatable base plate 40 when tightened.

In embodiments comprising a trench-like groove 60 instead of discrete grooves or notches 41, the screws 42 may be secured at any position along the trench-like grooves 50, permitting many more angles/positions for the keel 14 to be adjusted to.

In certain embodiments, an adjustable keel 14 described herein is fixed to a rotatable base plate 40. In a preferred embodiment, an adjustable keel 14 and a rotatable base plate 40 described herein are provided together as a single, molded or machined component.

Figure 9A:
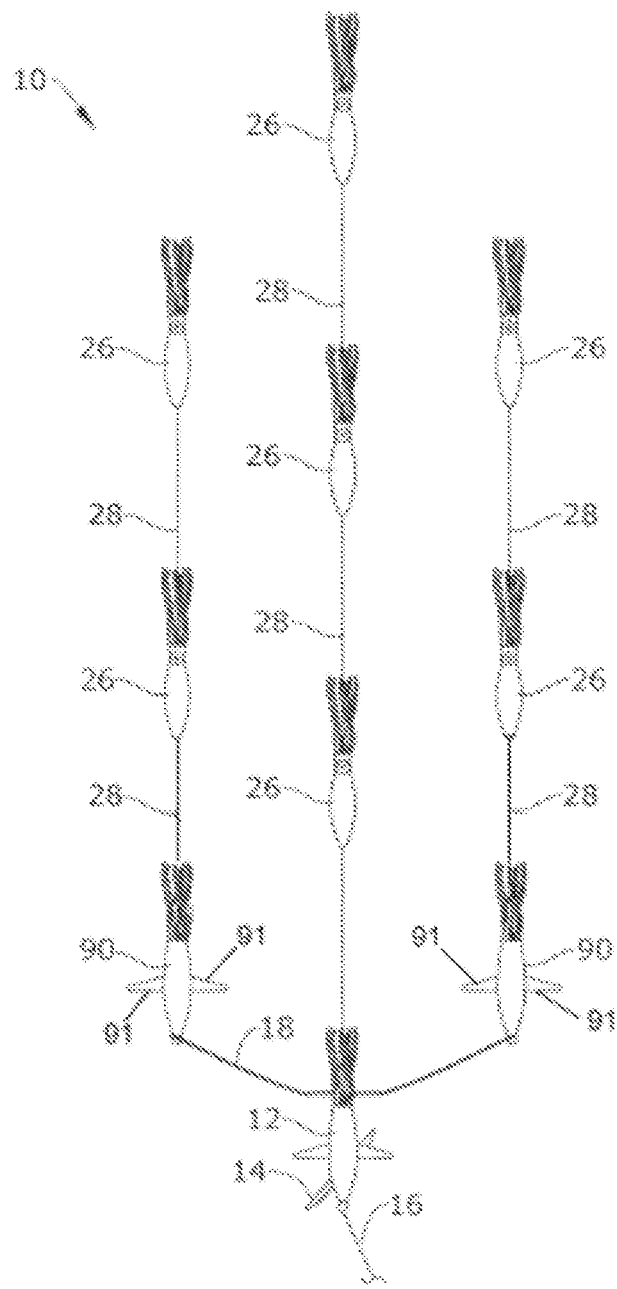
FIGS. 9A-9D show a top plan view of an embodiment of the fishing lure spreader bar comprising teaser baits or "birds" as described herein.

Referring to FIG. 9A, the spreader bar described herein may comprise one or more teaser baits 90 (also referred to as "birds") with wings 91 that extend from the body of teaser bait 90.

In an aspect, a teaser bait 90 provides an alternative means of counter-weighting and planing lift and may be used in combination with or in place of a counterweight 24. In a preferred embodiment, the teaser bait(s) 90 is/are composed of a dense plastic material. In an aspect, however, any material may be used to mold or otherwise manufacture the teaser bait(s) 90.

In an aspect, the teaser bait(s) 90 weigh(s) about 0.5 ounces to about 2.0 ounces, preferably about 0.75 ounces to about 1.5 ounces, more preferably about 1.0 ounce.

It has been found that, when using a configuration as depicted in FIG. 9A, wherein the teaser baits 90 are used as substitutes for counterweighting and lift bait, the teaser bait on the inboard rod provides sufficient lift such that when it is combined with the bodyweight of the dense plastic teaser bait on the outboard rod acting as a counterweight, the lure is able to perform desirably in most sea conditions such that target species are attracted and that the lure does not walk or otherwise behave in an undesirable manner.

In an aspect, one or more of the lures 26 preferably comprises a hook 100. In certain preferred embodiments, each lure 26 comprises a hook.

Figure 9B:
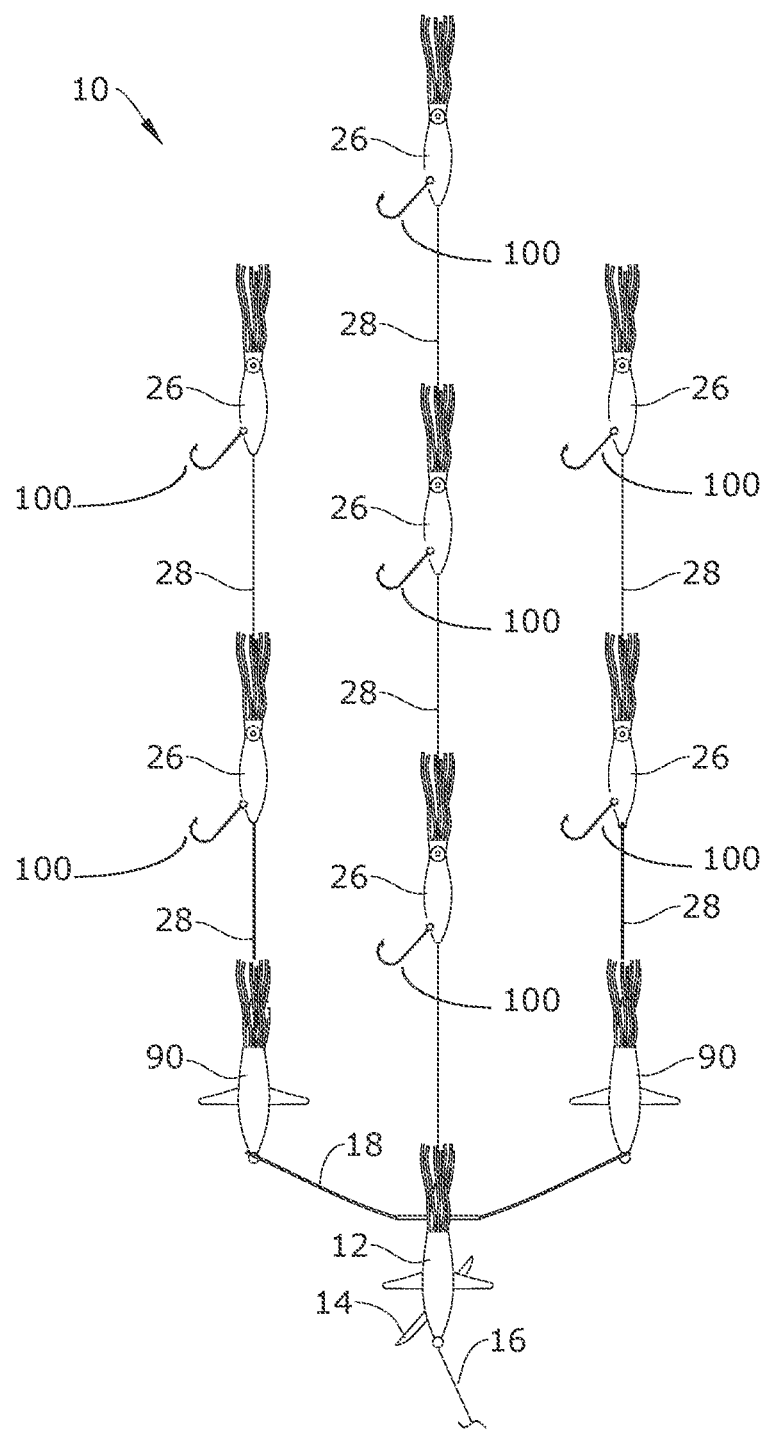

By way of illustration and for simplicity, FIG. 9B depicts an embodiment comprising a hook 100 on each lure 26. This embodiment is not intended to be limiting. In some embodiments, the teaser bait(s) 90 may comprise a hook 100. In other embodiments, the teaser bait(s) do(es) not comprise a hook.

Figure 9C:
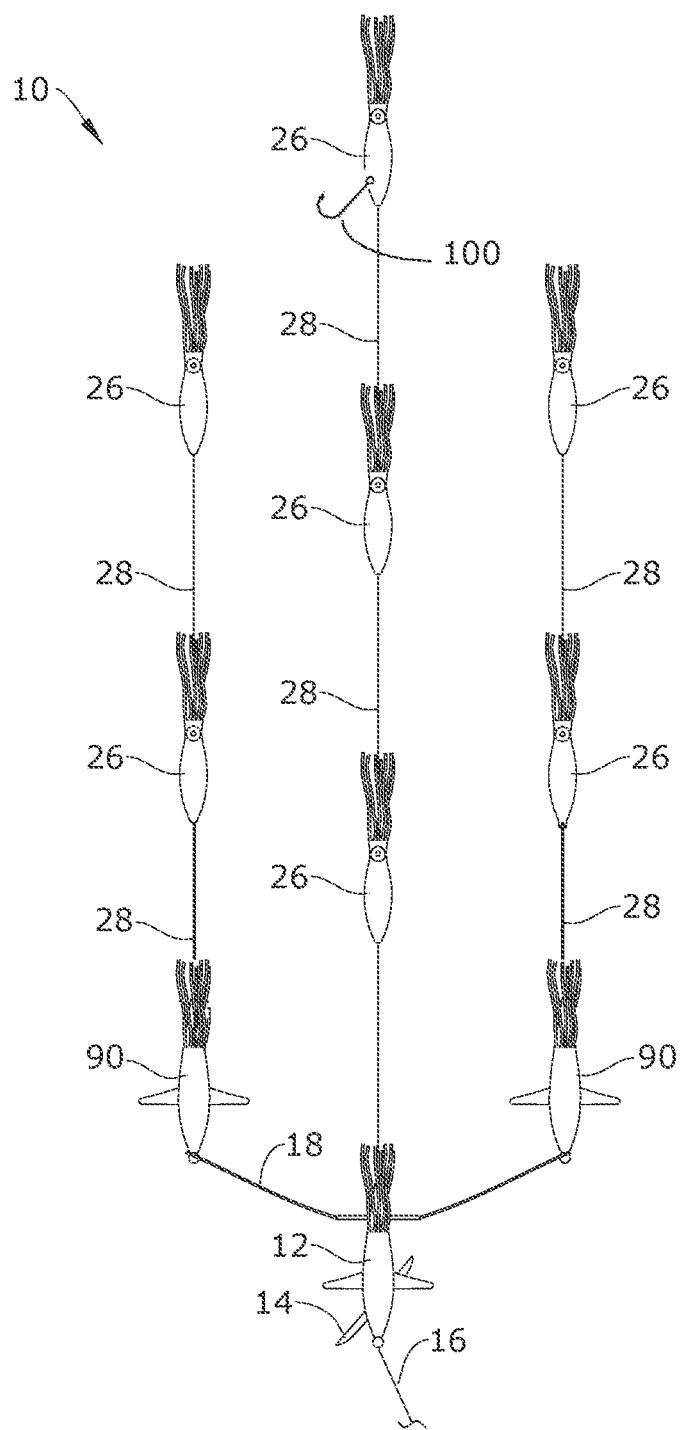

FIG. 9C depicts an embodiment comprising a hook only on the rear-most lure in an alternative preferred embodiment.

In an aspect, a hook may be affixed to any location on a lure.

Figure 9D:
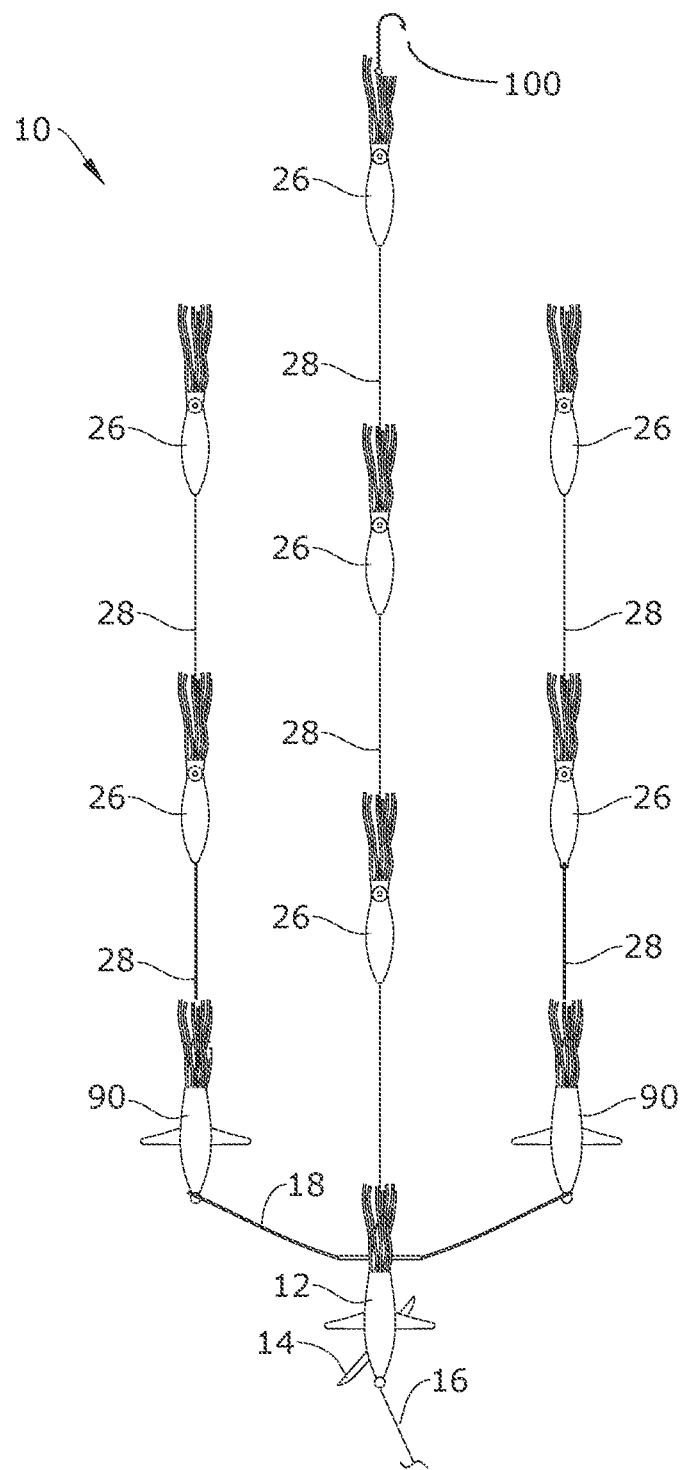

FIG. 9D depicts an embodiment in which a hook is affixed to a lure at a point which is distal relative to the lure which it trails.

In some embodiments, a hook may trail directly behind a lure, as depicted in FIG. 9D. In other embodiments, a hook may extend downwardly from any point on the underside of a lure.

Figure 3A:
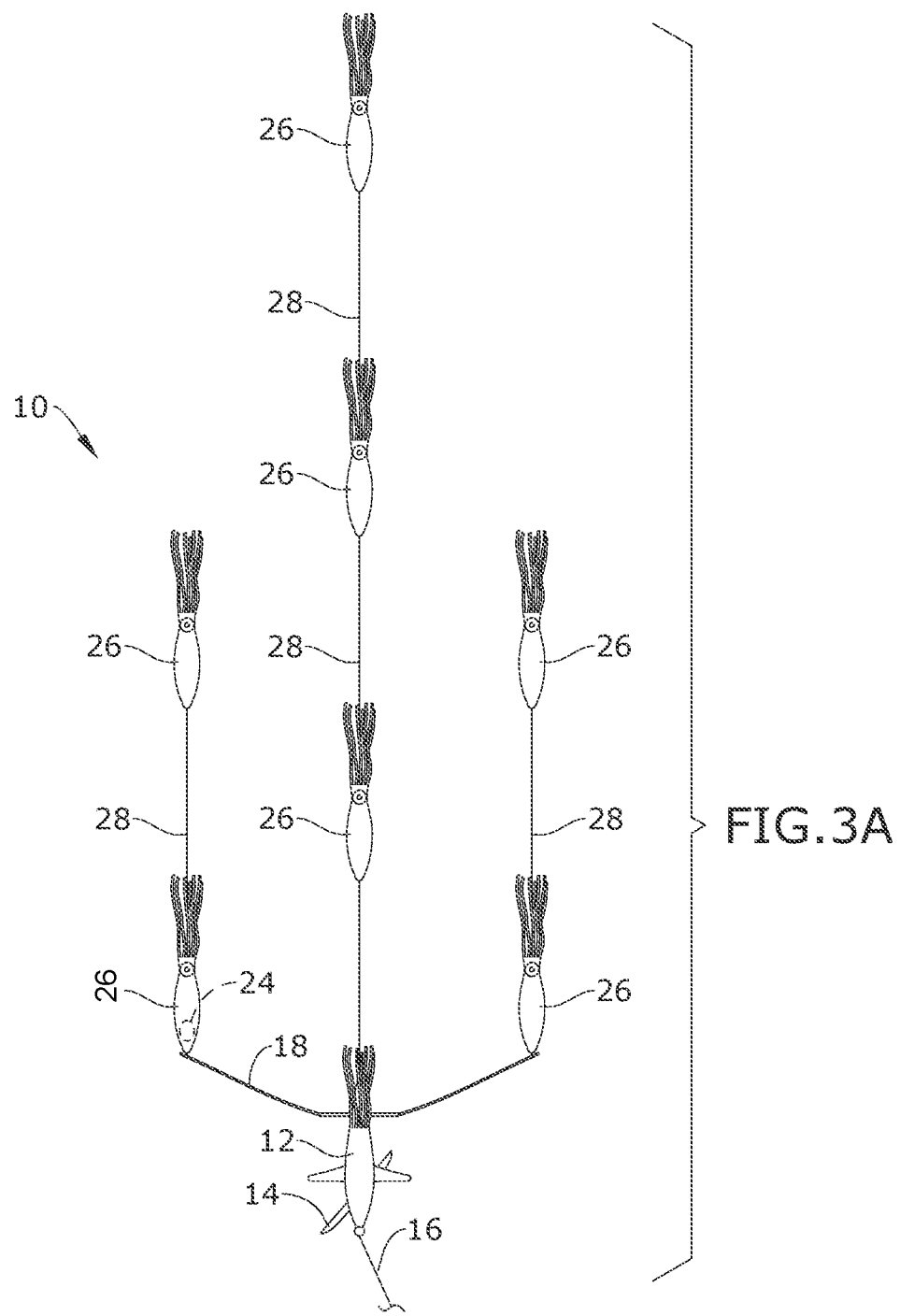
FIGS. 3A-3C show a top plan view of an embodiment of the fishing lure spreader bar.
Figure 3B:
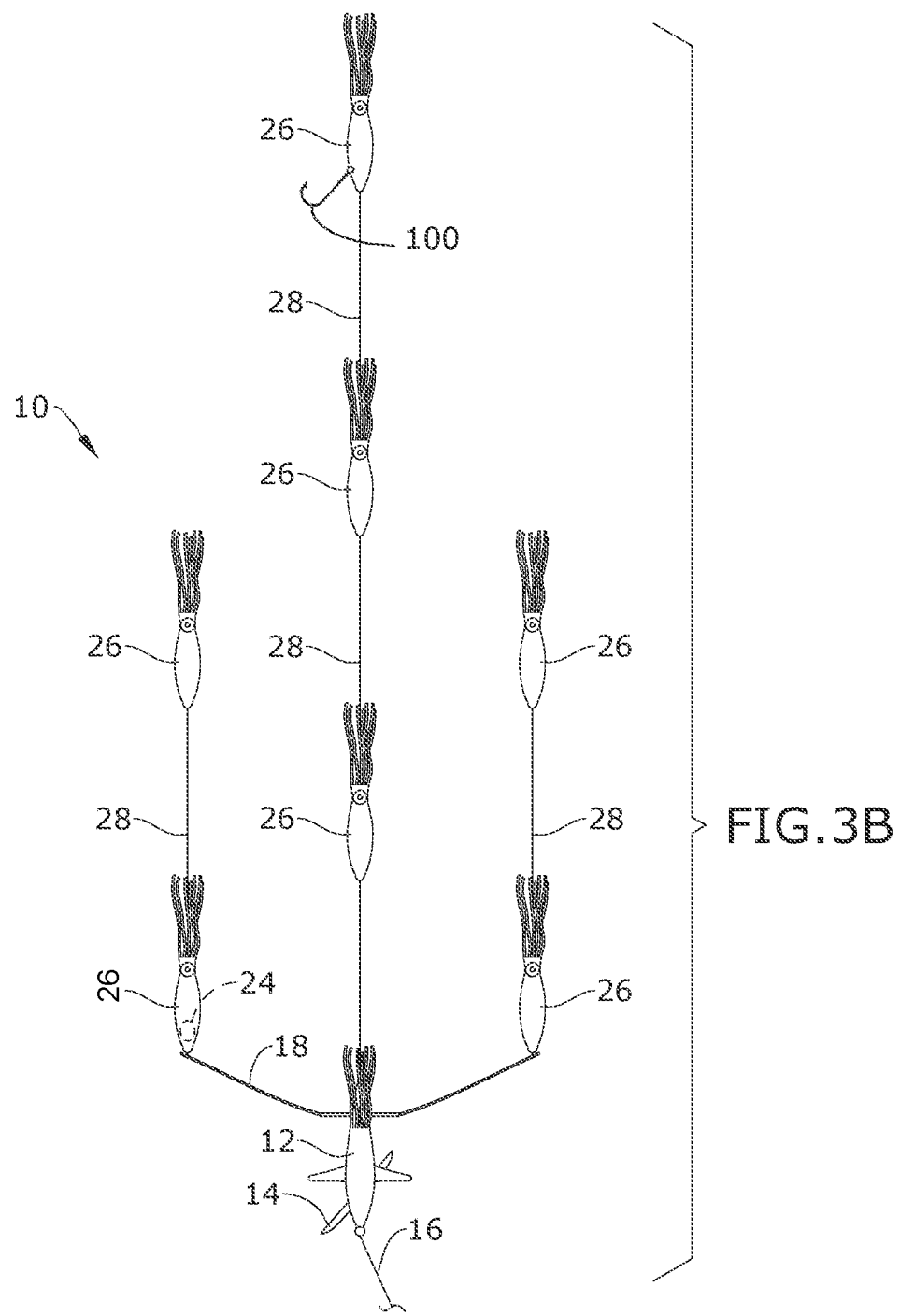

By way of illustration and for simplicity, FIG. 3B similarly depicts an embodiment comprising a hook 100 on each lure 26. This embodiment is not intended to be limiting.

Figure 3C:
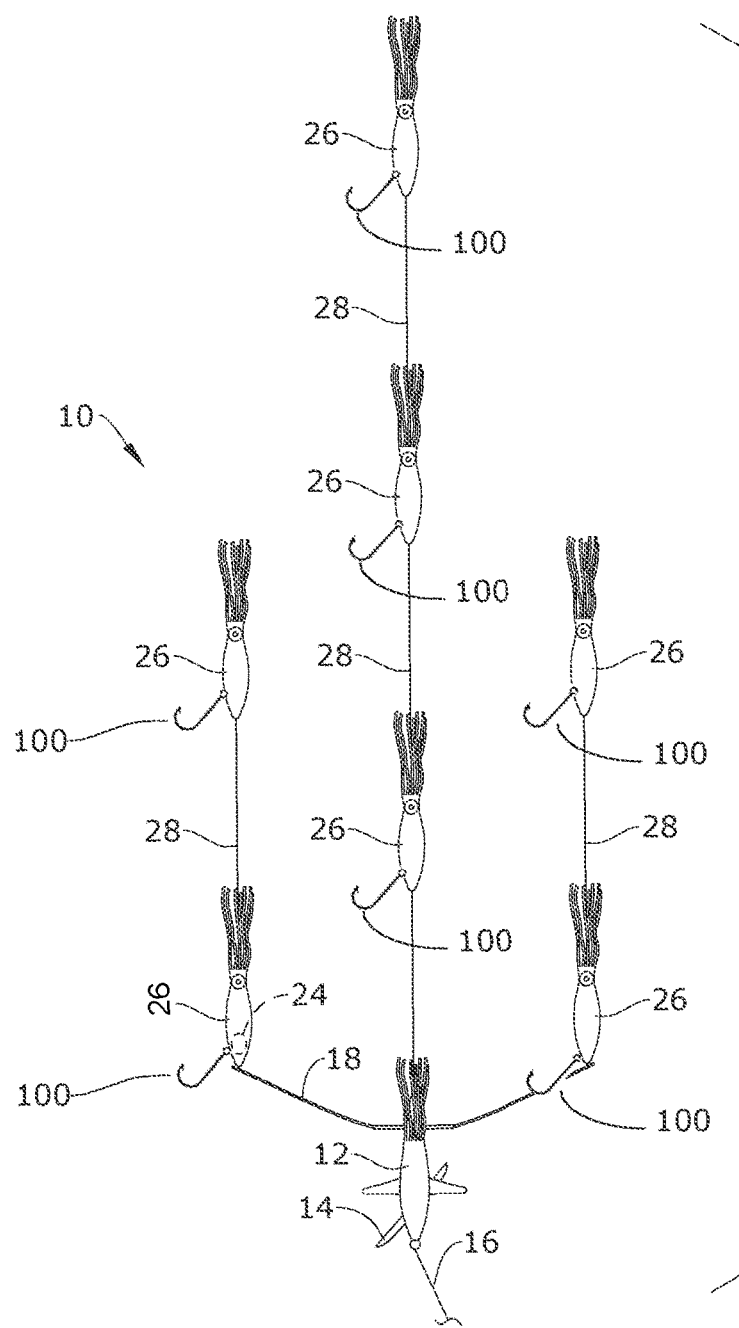
Figure 4:
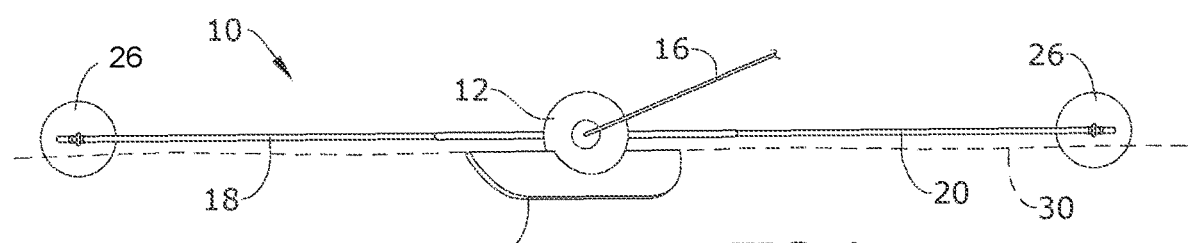
FIG. 4 is a front elevation view of the fishing lure spreader bar 10 in use, shown with a waterline 30 shown in dashed lines.

FIG. 3C depicts an embodiment comprising a hook only on the rear-most lure in an alternative preferred embodiment.

In preferred embodiments, the rotatable base plate does not need to be lifted off of the elongated central body when adjusting the keel angle.

In a preferred embodiment, the adjustable keel is not secured to the rotatable base plate using a screw.

In a preferred embodiment, a screw is not inserted through or into the center of the rotatable base plate.

In a preferred embodiment, the keel 14 is affixed securely to the rotatable base plate 40 and any adjustment or repositioning of the keel is performed by adjusting or repositioning the rotatable base plate 40 by loosening the screws 42 and rotating the rotatable base plate 40 to a new position by securing the screws 42 at a different position 41.

It will be apparent to those skilled in the art that numerous modifications and variations of the described examples and embodiments are possible in light of the above teachings of the disclosure. The disclosed examples and embodiments are presented for purposes of illustration only.

Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

A person of ordinary skill in the art would understand and appreciate that a keel adjusted to a position of 45 degrees relative to the longitudinal axis of the elongated central body would result in the "strongest" keel angle. That is, an angle of 45 degrees causes the lure to be pushed the furthest distance laterally outwardly from the fishing vessel.

In an aspect, the rotatable base plate may be rotated to set the adjustable keel at any desired angle.

In certain embodiments, a rotatable base plate may be rotated such that the adjustable keel is set at an angle of 45 or 40 or 35 or 30 or 27.5 or 25 or 22.5 or 20 or 15 or 10 or 5 degrees to the left or to the right, relative to the longitudinal axis of the elongated central body, or parallel to the longitudinal axis of the elongated central body.

It should be understood, of course, that the foregoing relates to exemplary embodiments and that modifications may be made without departing from the spirit and scope of the invention as set forth in the claims.

The features of the trolling spreader bar described herein have been found to act in concert to achieve a surprisingly stable, self-righting, and level trolling means, which is unexpectedly effective in attracting target species in the water.

A skilled artisan would understand through use of embodiments described herein that use of the ventral keel keeps the angled area of the keel below the surface of the water even during the planing action achieved under typical trolling speeds.

Additionally, the skilled artisan would appreciate that counterweighting causes the outboard end of the spreader bar to be held down on the surface of the water as pressure from the keel tries to roll it over, creating critical stability—i.e., the counter weight also pulls down the outboard arm of the spreader bar.

Moreover, the first bait on the inboard end of the spreader bar has a firm body with a float in its body causing it to act as a planing mechanism to lift the end as the keel tries to drive it under water, creating critical stability.

Meanwhile, the plurality of bait lures causes a steady and even aft ward pressure on the entire spreader bar therefor keeping it running uniformly in a forward direction and not twisting.

The angled lateral fins mounted to the elongated central body cause the main hub area (i.e., the elongated central body) to be lifted during forward motion in rough seas, while the aft sweep causes the spread bar system to be more stable in preventing "walking" or "flipping".

Embodiments described herein have been found to achieve superior results as compared to embodiments which comprise rudders or rudder systems. A keel allows an entire object to be pushed laterally, whereas a rudder system results in steering with limited ability for sideways movement. The adjustable keel of embodiments described herein therefore permits a skilled artisan to compensate for water conditions and adjust location of the trolling spreader bar in the water to attract different target species and accommodate for marine conditions.

In an aspect, embodiments described herein have been found to obviate the need for outriggers, which are expensive and complicated, especially for novice or recreational fisherman. The typical novice fisherman likely does not own or have access to an outrigger. Thus, embodiments described herein solve an unmet need in the marketplace for more cost-efficient and accessible means of trolling.

As used in the following Examples, the term "stability" should be understood as denoting the lure behavior as it skips across the surface of the water under forward movement and momentum.

A skilled artisan would understand that the terms "walking", "crabbing", and "tumbling" denote undesirably unstable lures which skip across the water's surface significantly. In particular, these terms denote a process wherein forward motion and wave activity cause the ends of the rod or bar to lift slightly off the water in an alternating pattern, which can continue and become exaggerated or excessive. While some walking may be acceptable for effective fishing, excessive or continued walking is undesirable as it will render a lure unfishable and fail to attract target species negated by the activity.

A skilled artisan would understand that the term "self-righting" or similar terms denotes a lures ability to return to the surface and resume normal function after disappearing subsurface due to, for example, rough waters. In the Examples that follow, the lures tested were forced to flip to determine their ability to self-right.

The following examples serve to illustrate certain aspects of the disclosure and are not intended to limit the disclosure.

EXAMPLES

Example 1

A lure having the following configuration was tested at a forward speed of 7 knots:
(1) elongated central body with keel
(2) spreader bar
(3) counterweight (tight to rod)
(4) lift bait (tight to rod)
(5) plurality of baits on the center line
(6) plurality of baits on the outward line
(7) plurality of baits on the inward line
(8) lateral wings/fins on the elongated central body A lateral movement of 12 degrees was observed, measured outwardly from the normal straight-back line of travel.

It was also observed that the spreader bar experienced a 1-degree inboard lean relative to the surface of the water.

The lure of Example 1 was observed to be very stable and was capable of righting itself Example 2

A lure having the following configuration was tested at a forward speed of 7 knots:
(1) elongated central body with keel
(2) spreader bar
(3) counterweight (tight to rod)
(5) plurality of baits on the center line
(6) plurality of baits on the outward line
(7) plurality of baits on the inward line
(8) lateral wings/fins on the elongated central body A lateral movement of 11 degrees was observed, measured outwardly from the normal straight-back line of travel.

It was also observed that the spreader bar experienced a 2-degree inboard lean relative to the surface of the water.

The lure of Example 2 was observed to be very stable and was capable of righting itself Example 3

A lure having the following configuration was tested at a forward speed of 7 knots:

(1) elongated central body with keel
(2) spreader bar
(3) counterweight (tight to rod)
(4) lift bait (tight to rod)
(5) plurality of baits on the center line
(6) plurality of baits on the outward line
(7) plurality of baits on the inward line A lateral movement of 12 degrees was observed, measured outwardly from the normal straight-back line of travel.

It was also observed that the spreader bar experienced a 1-degree inboard lean relative to the surface of the water.

The lure of Example 3 was observed to be was capable of righting itself.

However, the lure of Example 3 was observed to be unstable. The elongated central body and plurality of baits dived subsurface approximately every 10 to 15 seconds and would resurface 1 to 2 seconds thereafter. The absence of (8) lateral wings/fins on the elongated central body thus affected stability and overall utility of the lure.

Example 4

A lure having the following configuration was tested at a forward speed of 7 knots:
(1) elongated central body with keel
(2) spreader bar
(5) plurality of baits on the center line
(6) plurality of baits on the outward line
(7) plurality of baits on the inward line
(8) lateral wings/fins on the elongated central body A lateral movement of 8.5 degrees was observed, measured outwardly from the normal straight-back line of travel.

It was also observed that the spreader bar experienced a substantial 10-degree inboard lean relative to the surface of the water.

The lure of Example 4 was observed to be was capable of righting itself.

However, walking was observed in the lure of Example 4, and the inboard rod and plurality of boats were driven under the surface of the water.

Example 5

A lure having the following configuration was tested at a forward speed of 7 knots:
(1) elongated central body with keel
(2) spreader bar
(3) counterweight (tight to rod)
(5) plurality of baits on the center line
(8) lateral wings/fins on the elongated central body A lateral movement of 9 degrees was observed for 10 seconds followed by erratic behavior, after which the lure returned to 0 degrees, measured outwardly from the normal straight-back line of travel.

It was also observed that the spreader bar experienced a 5-degree inboard lean relative to the surface of the water.

The lure of Example 5 was observed to be unstable and incapable of righting itself. Erratic walking was observed, followed by flipping to subsurface in under 60 seconds.

Example 6

A lure having the following configuration was tested at a forward speed of 7 knots:
(1) elongated central body with keel
(2) spreader bar
(3) counterweight (tight to rod)
(8) lateral wings/fins on the elongated central body A lateral movement of 6 degrees was observed, measured outwardly from the normal straight-back line of travel for 10 seconds, followed by erratic behavior and then a return to 0 degrees.

The lure's behavior was too erratic to measure any inboard lean.

Erratic movement was observed, including lunging forward airborne.

The lure of Example 6 was observed to be unstable and incapable of righting itself.

Example 7

A lure having the following configuration was tested at a forward speed of 7 knots:
(1) elongated central body with keel
(5) plurality of baits on the center line
(8) lateral wings/fins on the elongated central body A lateral movement of 0 degrees was observed, measured outwardly from the normal straight-back line of travel and thus there was no inboard lean to measure.

The central body of the lure erratically flipped for the duration of the test.

The lure of Example 7 was observed to be unstable and incapable of righting itself.

Example 8

A lure having the following configuration was tested at a forward speed of 7 knots:
(1) elongated central body with keel
(2) spreader bar
(5) plurality of baits on the center line
(8) lateral wings/fins on the elongated central body A lateral movement of 6 degrees was observed, measured outwardly from the normal straight-back line of travel for 3 seconds, followed by erratic behavior and then a return to 0 degrees.

Any inboard lean was not measurable.

The lure started sideward motion upon deployment to the water and flipped after 3 seconds, flailing continuously thereafter.

The lure of Example 8 was observed to be unstable and incapable of righting itself.

Example 9

A lure having the following configuration was tested at a forward speed of 7 knots:
(1) elongated central body with keel
(2) spreader bar
(8) lateral wings/fins on the elongated central body A lateral movement of 3 degrees was observed, measured outwardly from the normal straight-back line of travel for 3 seconds, followed by erratic behavior and then a return to 0 degrees.

Any inboard lean was not measurable.

The lure flipped almost immediately upon deployment and continued to flip erratically.

The lure of Example 9 was observed to be unstable and incapable of righting itself.

Example 10

A lure having the following configuration was tested at a forward speed of 7 knots:

(1) elongated central body with keel
(8) lateral wings/fins on the elongated central body A lateral movement of 0 degrees was observed, measured outwardly from the normal straight-back line of travel. Thus, no inboard lean was measured.

The lure of Example 10 was observed to flail and submerge repeatedly.

The invention claimed is:

1. A trolling spreader bar comprising:
an elongated central body;
a spreader bar that extends laterally outward from the elongated central body, wherein the spreader bar comprises a first rod and a second rod that extend laterally from the elongated central body;
a keel that extends from a ventral surface of the elongated central body at an angle relative to a longitudinal axis of the elongated central body, such that, when trolling in a body of water at or near a surface of the body of water, the elongated central body is guided laterally outwardly from a direction of travel of the trolling spreader bar while trolling;
two first bait lures, each of the two first bait lures having a head end and a tail end, wherein one first bait lure of the two first bait lures is attached to a distal end of the first rod at its head end, and another first bait lure of the two first bait lures is attached to a distal end of the second rod at its head end; and
a plurality of bait lures interconnected to each of the two first bait lures by a line extending between a tail end of a preceding bait lure and a head end of a succeeding bait lure;
wherein at least one of the two first bait lures further comprises a counterweight, wherein the counterweight is carried within a body of the at least one of the two first bait lures.

2. The trolling spreader bar according to claim 1, wherein the angle relative to a longitudinal axis of the elongated central body is adjustable.

3. The trolling spreader bar according to claim 1, further comprising:
a rotatable base plate comprising at least two sliding grooves for receiving screws to secure the rotatable base plate to the elongated central body;
wherein the keel is affixed securely to the rotatable base plate.

4. The trolling spreader bar according to claim 1, further comprising:
a rotatable base plate comprising at least two sliding grooves and at least two pairs of notches for receiving screws to secure the rotatable base plate to the elongated central body, said notches being provided within the at least two sliding grooves;
wherein the keel is affixed securely to the rotatable base plate.

5. The trolling spreader bar according to claim 1, further comprising at least one lateral fin extending outwardly from the elongated central body.

6. The trolling spreader bar of claim 1, wherein the first rod and the second rod have an aft sweep.

7. The trolling spreader bar according to claim 1, further comprising:
a rotatable base plate secured to the ventral surface of the elongated body, the rotatable base plate comprising the keel secured thereto;
the elongated body having at least a pair of threaded holes for receiving screws for securement of the rotatable base plate to the elongated body.

8. The fishing lure according to claim 7 further comprising one or more lateral fins on said elongated body.

9. The fishing lure according to claim 7, wherein the keel and the rotatable base plate are a single molded or machine piece.

10. The fishing lure according to claim 7, wherein the rotatable base plate and elongated body are configured such that the rotatable base plate is rotatable about a central axis while remaining on the elongated body.

11. The fishing lure according to claim 7, wherein the rotatable base plate comprises at least one groove through which screws are inserted to secure said rotatable base plate to the elongated body via the threaded holes of the elongated body.

12. The fishing lure according to claim 11 further comprising at least one pair of notches in the at least one groove, said at least one pair of notches configured to accept the screws and permit said screws to be tightened into the threaded holes of the elongated body.

13. A trolling spreader bar comprising:
an elongated central body;
a spreader bar that extends laterally outward from the elongated central body, wherein the spreader bar comprises a first rod and a second rod that extend laterally from the elongated central body;
a keel that extends from a ventral surface of the elongated central body at an angle relative to a longitudinal axis of the elongated central body, such that, when trolling in a body of water at or near a surface of the body of water, the elongated central body is guided laterally outwardly from a direction of travel of the trolling spreader bar while trolling;
two first bait lures, each of the two first bait lures having a head end and a tail end, wherein one first bait lure of the two first bait lures is attached to a distal end of the first rod at its head end, and another first bait lure of the two first bait lures is attached to a distal end of the second rod at its head end; and
a plurality of bait lures interconnected to each of the two first bait lures by a line extending between a tail end of a preceding bait lure and a head end of a succeeding bait lure;
wherein at least one of the two first bait lures is a teaser bait lure having two wings extending laterally from the body of the teaser bait lure, wherein the teaser bait lure comprises dense plastic material.

* * * * *